(12) United States Patent
Shin et al.

(10) Patent No.: US 7,933,217 B2
(45) Date of Patent: Apr. 26, 2011

(54) WIRELESS NETWORK SYSTEM AND METHOD FOR TRANSMITTING AND RECEIVING DATA IN THE WIRELESS NETWORK

(75) Inventors: Se-young Shin, Suwon-si (KR); Chang-yeul Kwon, Yongin-si (KR)

(73) Assignee: Samsung Electronics Co., Ltd., Suwn-si (KR)

( * ) Notice: Subject to any disclaimer, the term of this patent is extended or adjusted under 35 U.S.C. 154(b) by 1069 days.

(21) Appl. No.: 11/723,861

(22) Filed: Mar. 22, 2007

(65) Prior Publication Data

US 2007/0258431 A1 Nov. 8, 2007

Related U.S. Application Data

(60) Provisional application No. 60/796,891, filed on May 3, 2006.

(30) Foreign Application Priority Data

Sep. 13, 2006 (KR) .................. 10-2006-0088722

(51) Int. Cl.
*H04W 24/00* (2009.01)
(52) U.S. Cl. .................. 370/252; 370/522
(58) Field of Classification Search .......... 370/252, 370/522
See application file for complete search history.

(56) References Cited

U.S. PATENT DOCUMENTS

| 2003/0036404 A1 | 2/2003 | Adachi et al. |
| 2009/0046653 A1* | 2/2009 | Singh et al. .................. 370/330 |

FOREIGN PATENT DOCUMENTS

EP 1 641 180 A1 3/2006

OTHER PUBLICATIONS

Dhananjay Lal et al., "Performance evaluation of medium access control for multiple-beam antenna nodes in a wireless LAN", IEEE Transactions on Parallel and Distributed Systems, Dec. 2004, pp. 1117-1129, vol. 15, No. 12, IEEE Computer Society.

* cited by examiner

*Primary Examiner* — Melvin Marcelo
(74) *Attorney, Agent, or Firm* — Sughrue Mion, PLLC

(57) ABSTRACT

Provided is a wireless network system and a method for transmitting and receiving data in the wireless network, which have a particular time period for a beam search in a superframe thereof in order to enable stations, which carry out directional communications with a high frequency bandwidth, to efficiently perform a beam search. A wireless network coordinator in the wireless network system includes a media access control unit generating a beacon frame which constitutes a superframe including at least one channel time block; a bandwidth management unit setting a specific channel time block among the channel time blocks to a time period during which a packet for a beam search is transmitted and received among stations in a network; and a transmission unit transmitting the beacon frame having information on the setting through a predetermined communication channel.

36 Claims, 9 Drawing Sheets

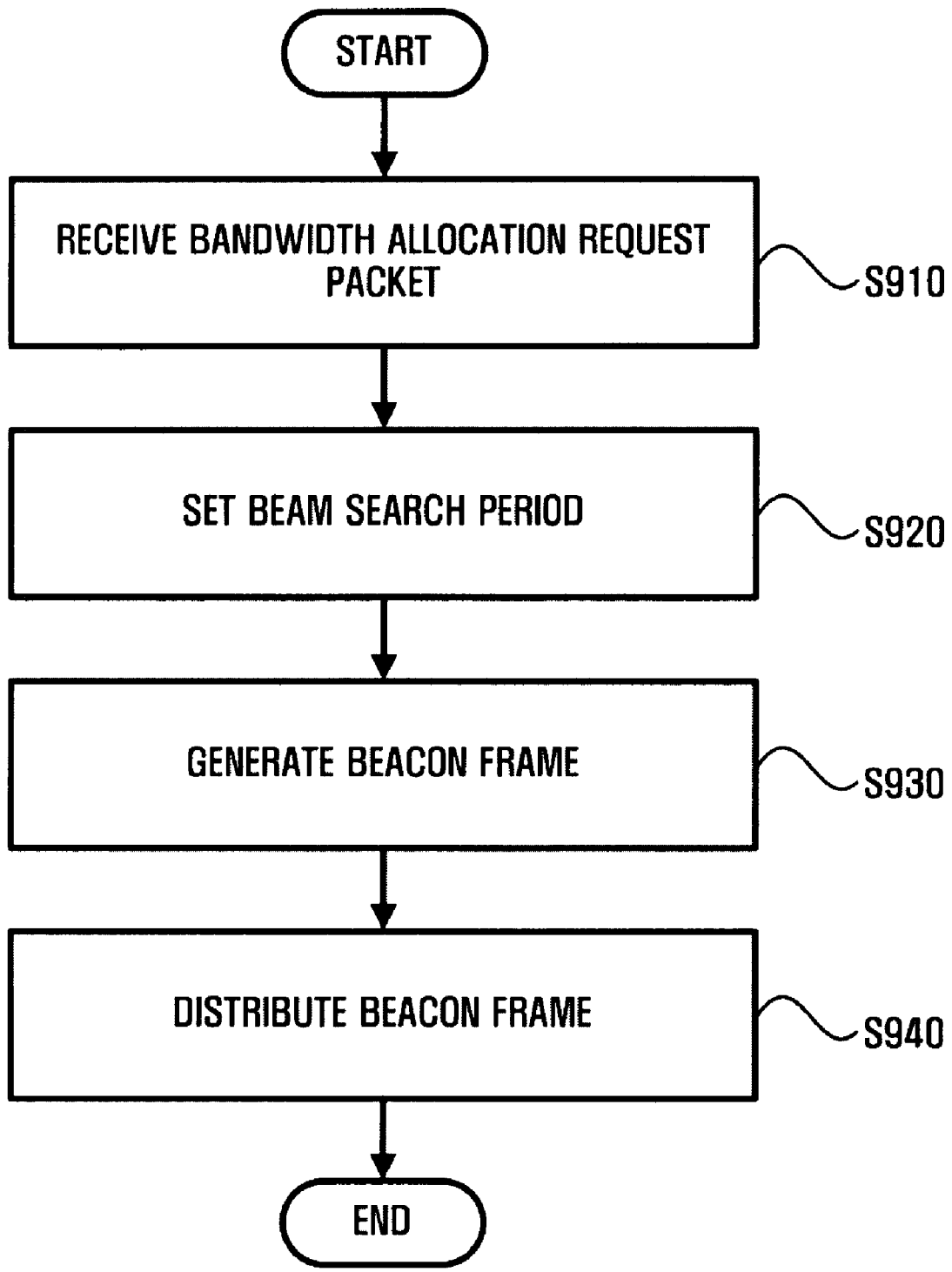

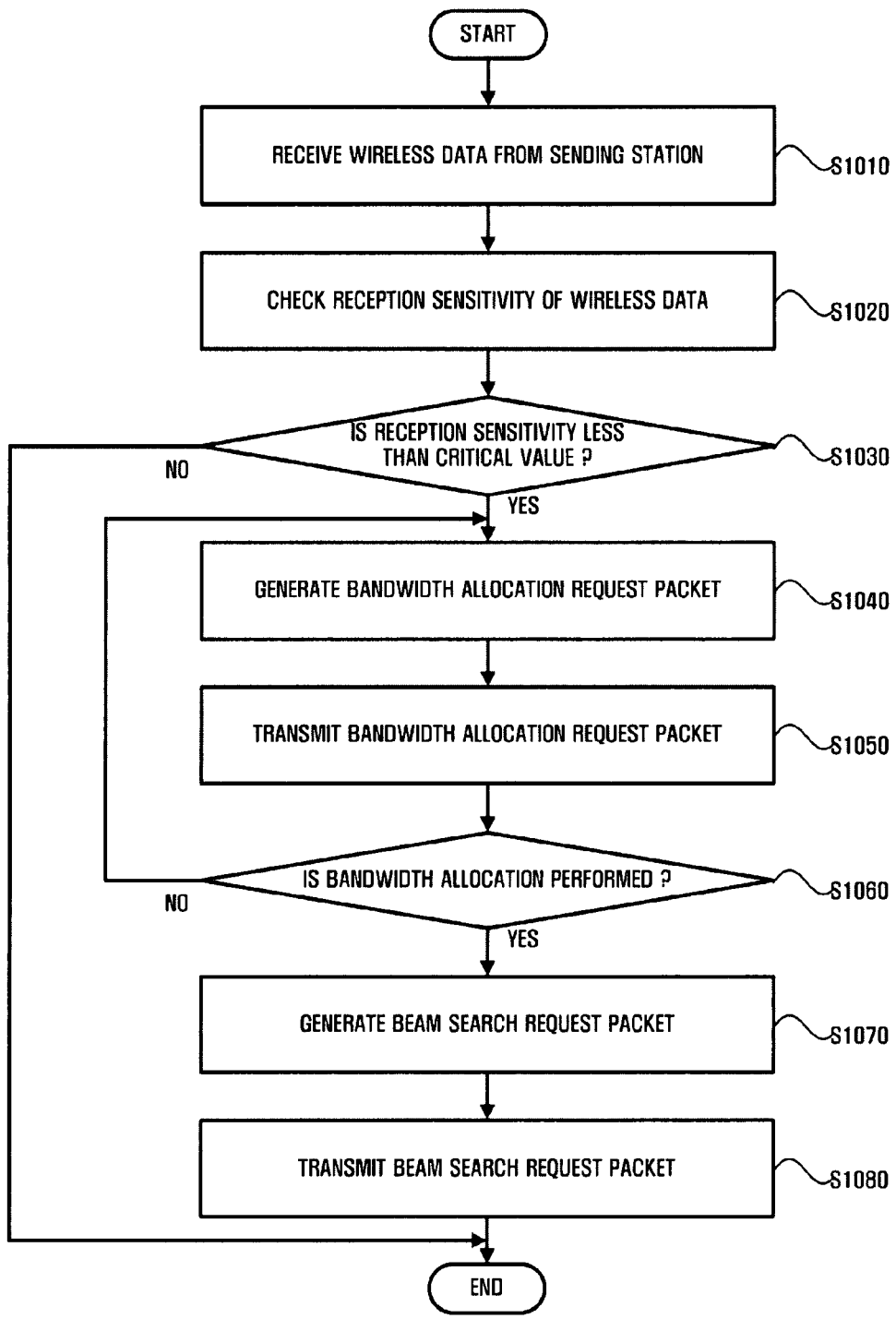

WIRELESS NETWORK SYSTEM AND METHOD FOR TRANSMITTING AND RECEIVING DATA IN THE WIRELESS NETWORK

CROSS-REFERENCE TO RELATED APPLICATION

This application is based on and claims priority from Korean Patent Application No. 10-2006-0088722 filed on Sep. 13, 2006 in the Korean Intellectual Property Office, and U.S. Provisional Patent Application No. 60/796,891, filed on May 3, 2006 in the United States Patent and Trademark Office, the disclosures of which is incorporated herein in its entirety by reference.

BACKGROUND OF THE INVENTION

1. Field of the Invention

Apparatuses and methods consistent with the present invention relate to wireless networking and transmitting and receiving data in the wireless network, and more particularly, to a wireless network system and a method for transmitting and receiving data in the wireless network, which have a particular time period for a beam search in a superframe thereof in order to enable stations, which carry out directional communications with a high frequency bandwidth, to efficiently perform a beam search.

2. Description of the Prior Art

FIG. 1 is a view illustrating a half-duplex wireless network which adopts conventional Request-To-Send and Clear-To-Send signals.

Generally, a wireless network adopts a half-duplex scheme by which it is impossible to simultaneously perform transmission and reception. While accessing wireless media by using the half-duplex scheme, a Request-To-Send (RTS) signal 111 and a Clear-To-Send (CTS) signal 121 are used in order to prevent collision due to media possession.

A sending station 110, which has frames to be transmitted, transmits an RTS signal 111 to start a transmission procedure, and all neighboring stations which have received the RTS signal 111 stop generation of radio waves. Upon receiving the RTS signal 111, a receiving station 120 responds to the RTS signal 111 by means of the CTS signal 121, which in turn makes all neighboring stations stop to generate radio waves. The sending station 110 which has received the CTS signal 121 transmits a frame 112 and then receives an acknowledgement signal 122 from the receiving station 120 which has received the frame 112.

Carrier Sense Multiple Access with Collision Avoidance (CSMA/CA), which is a Media Access Control (MAC) algorithm generally used under the circumstances of wireless Local Area Network (LAN), is provided by Distributed Coordination Function (DCF) which, as in Ethernet, examines whether a wireless link is clear before the sending station 110 transmits the frame 112, and which uses any back-off at the time of an end of respective frames 112 in order to avoid collision with other stations.

A carrier sense function is used to determine whether transmission media are available, and is classified into a function for physically sensing the carrier and a function for virtually sensing the carrier. The function for physically sensing the carrier is provided by a physical layer, and depends on an adopted medium and an applied modulation scheme. The function for virtually sensing the carrier is provided by Network Allocation Vector (NAV), wherein the NAV corresponds to a timer which implies time information in a case where media have been reserved. Herein, the NAV is included in and transmitted by frame headers of the RTS signal 111 and the CTS signal 121, and both the sending station 110 and the receiving station 120 set times, which are necessary to complete their operations, to the NAV to prevent other stations from using the media.

Meanwhile, under the circumstances of the wireless Personal Area Network (PAN), timing is based on a superframe.

FIG. 2 is a view illustrating a conventional superframe, wherein the superframe 200 includes a beacon period 210, a contention access period 220, and a channel time allocation period 230.

The contention access period 220 is used to transmit or receive asynchronous data or a control command. The channel time allocation period 230 includes a Channel Time Allocation (CTA) 232 and a Management Channel Time Allocation (MCTA) 231, and is used to transmit or receive a control command, isochronous data or asynchronous data.

The length of the contention access period 220 is determined by the access point, and is transmitted to the stations, which constitute a network, by beacon frames which are distributed to the beacon period 210.

During the contention access period 220, the above CSMA/CA is used as a media access scheme. During the channel time allocation period 230, a Time Division Multiple Access (TDMA) scheme, which has a specific time window for each station, is used. Here, the access point allocates a channel time period to an apparatus which requests an access to media, and transmits data to or receives data from the relevant station during the allocated channel time period. Herein, the MCTA 231 is allocated to a pair of stations which are to transmit data to or receive data from each other, and is used as a common CTA which gains access by Time Division Multiple Access (TDMA) or which uses a Slotted Aloha protocol.

Along with the scheme by which compressed data is transmitted using a bandwidth of several Gbps, another scheme by which uncompressed data is transmitted using a bandwidth of several tens of Gbps is being tested. The uncompressed data, the volume of which is larger than that of the compressed data, can be transmitted only using a bandwidth of several tens of Gbps. In the case where packets are lost during data transmission, not compressing the data has a less of an effect on the output of the data than compressing the data.

Transmission or reception of data with a high frequency bandwidth can be carried out via directional communication. In the case where the directions of both stations are different from each other, the packets could be lost. Therefore, both stations have to change the direction of communication while they communicate with each other to perform a beam search. In the case where beam searching is to be carried out, if a communication medium is being used by other stations or a coordinator, it may be impossible to perform the beam searching.

Therefore, there has been a request for a technology which can facilitate the beam searching between the stations.

SUMMARY OF THE INVENTION

Accordingly, the present invention has been made to solve the above problems occurring in the prior art, and it is an aspect of the present invention to provide a wireless network system and a method for transmitting and receiving data in a wireless network, which specially have a separate time period for a beam search in a superframe thereof in order to enable stations, which carry out directional communications with a high frequency bandwidth, to efficiently perform a beam search.

Aspects of the present invention are not limited to that stated above. Those of ordinary skill in the art will clearly recognize additional aspects in view of the following description of the present invention.

According to an aspect of the present invention, there is provided a wireless network coordinator in a wireless network system, the coordinator including a media access control unit generating a beacon frame which constitutes a superframe having at least one channel time block; a bandwidth management unit setting a specific channel time block among the channel time blocks to a time period during which a packet for a beam search is transmitted and received among stations in a network; and a transmission unit transmitting the beacon frame having information on the setting through a predetermined communication channel.

According to another aspect of the present invention, there is provided a station for transmitting and receiving data in a wireless network system, the station including a media access control unit generating a packet which requests bandwidth allocation in a specific channel time block among one or more channel time blocks included in a superframe; and a transmission unit transmitting a packet which requests a beam search through a designated communication channel in the specific channel time block when the bandwidth allocation has been performed in response to the request.

According to another aspect of the present invention, there is provided a method of constructing a network in a wireless network system, the method including generating a beacon frame which constitutes a superframe having at least one channel time block; setting a specific channel time block among the channel time blocks to a time period during which a packet for a beam search is transmitted and received among stations in a network; and transmitting the beacon frame having information on the setting through a predetermined communication channel.

According to another aspect of the present invention, there is provided a method of transmitting and receiving data among stations in a wireless network system, the method including generating a packet which requests bandwidth allocation in a specific channel time block among one or more channel time blocks included in a superframe; transmitting the packet produced in the generating; and transmitting a packet which requests a beam search through a designated communication channel in the specific channel time block when the bandwidth allocation has been performed in response to the packet forwarded in the transmitting.

According to another aspect of the present invention, there is provided a packet data structure for requesting bandwidth allocation in a specific channel time block among one or more channel time blocks included in a superframe as a period during which a packet for a beam search is transmitted and received, the packet data structure including at least one among a destination identifier field detailing an identifier of an objective station requesting the bandwidth allocation; a stream request identifier field detailing an identifier of information which has been requested before the objective station receives a stream index; a stream index field detailing the stream index which is a kind of data so designated to be transmitted or received in the specific channel time block; a field for the number of blocks detailing the number of the specific channel time blocks included in the superframe; a field for the duration of time block detailing the duration between the respective channel time blocks included in the superframe; a minimum schedule period field detailing a minimum allowed time between the start time of two sequential time blocks for this allocation; and a priority field detailing the priority in which the packet requests the bandwidth allocation.

BRIEF DESCRIPTION OF THE DRAWINGS

The above and other aspects and features of the present invention will be more apparent from the following detailed description taken in conjunction with the accompanying drawings, in which:

FIG. 9 is a flowchart illustrating an operation of the wireless network coordinator according to an exemplary embodiment of the present invention; and FIG. 10 is a flowchart illustrating an operation of the station according to an exemplary embodiment of the present invention.

DETAILED DESCRIPTION OF THE EXEMPLARY EMBODIMENTS

Figure 1:
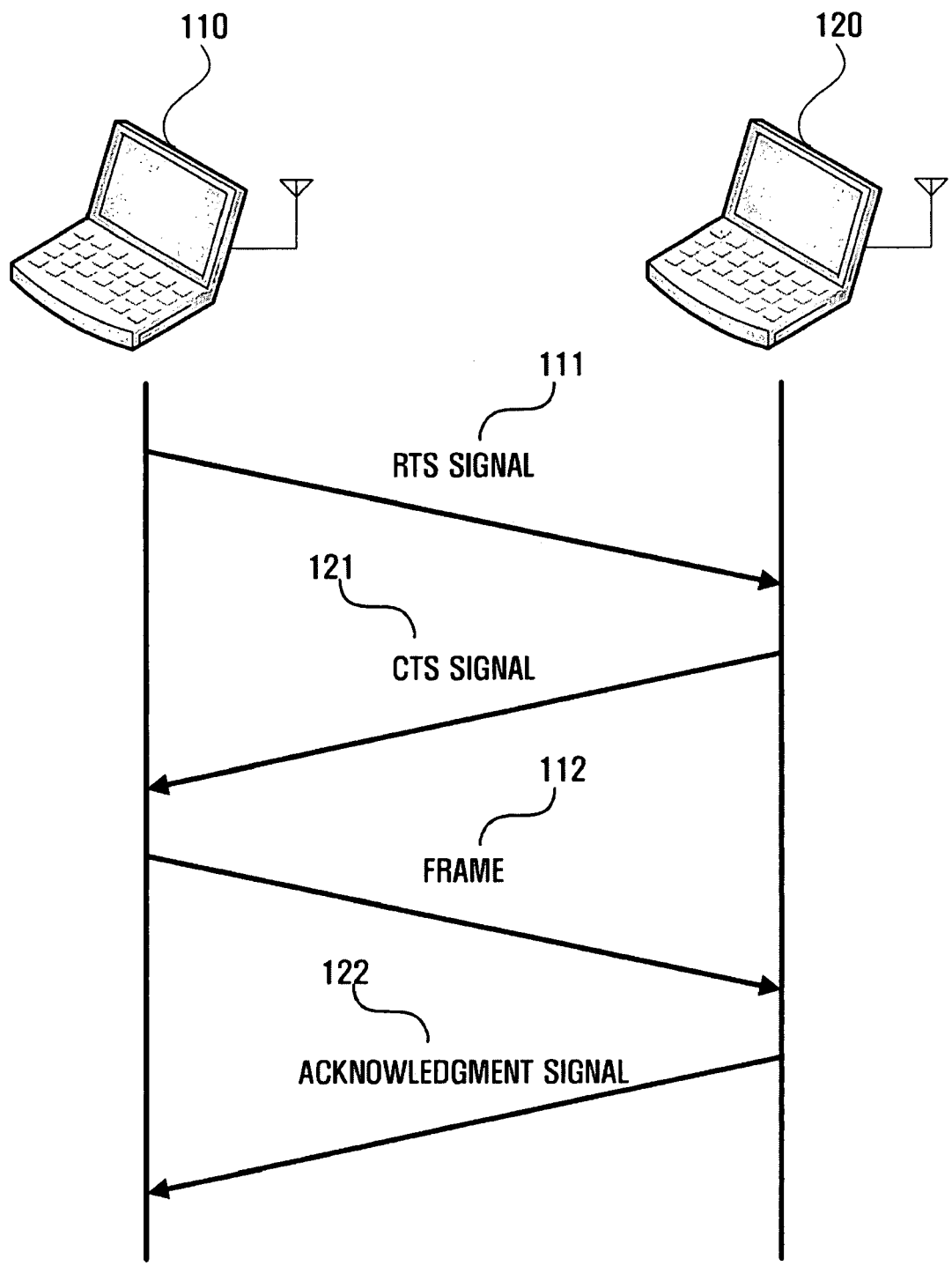
FIG. 1 is a view illustrating a half-duplex wireless network which adopts conventional Request-To-Send and Clear-To-Send signals.
Figure 2:
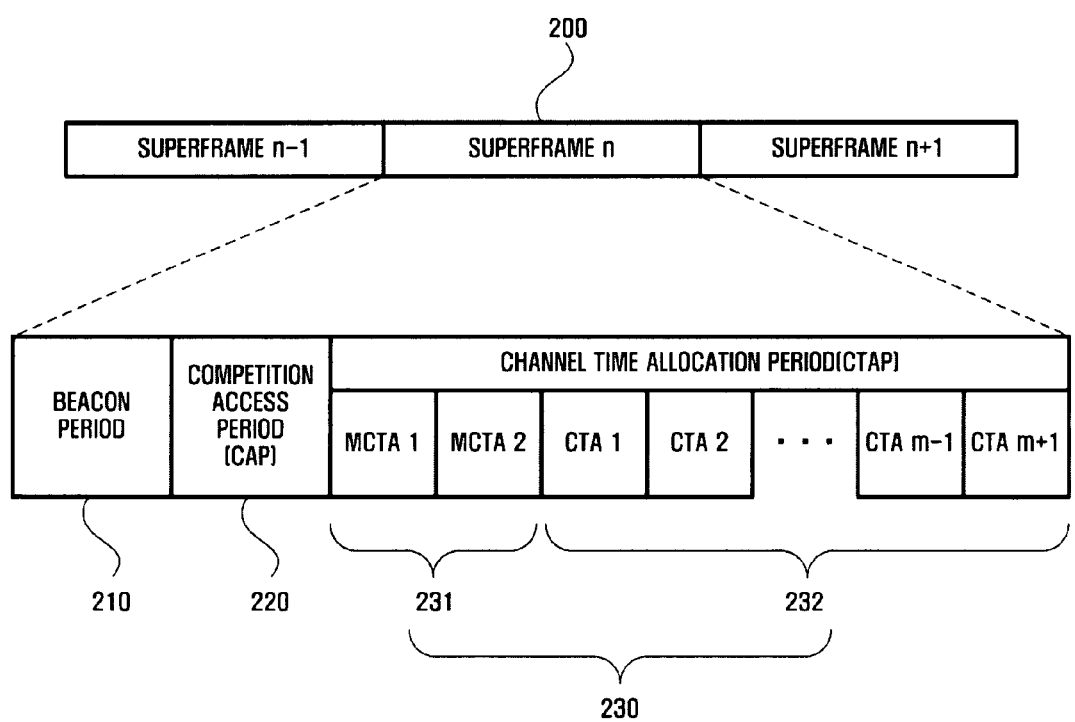
FIG. 2 is a view illustrating a conventional superframe.

Hereinafter, an exemplary embodiment of the present invention will be described with reference to the accompanying drawings. The matters defined in the description such as the detailed construction and elements are provided to assist in a comprehensive understanding of the invention. Thus, it should be apparent that the present invention can be carried out without those defined matters. In the following description of the present invention, the same drawing reference numerals are used for the same elements across different drawings. Also, a detailed description of known functions and configurations incorporated herein will be omitted when it may make the subject matter of the present invention unclear.

Figure 3:
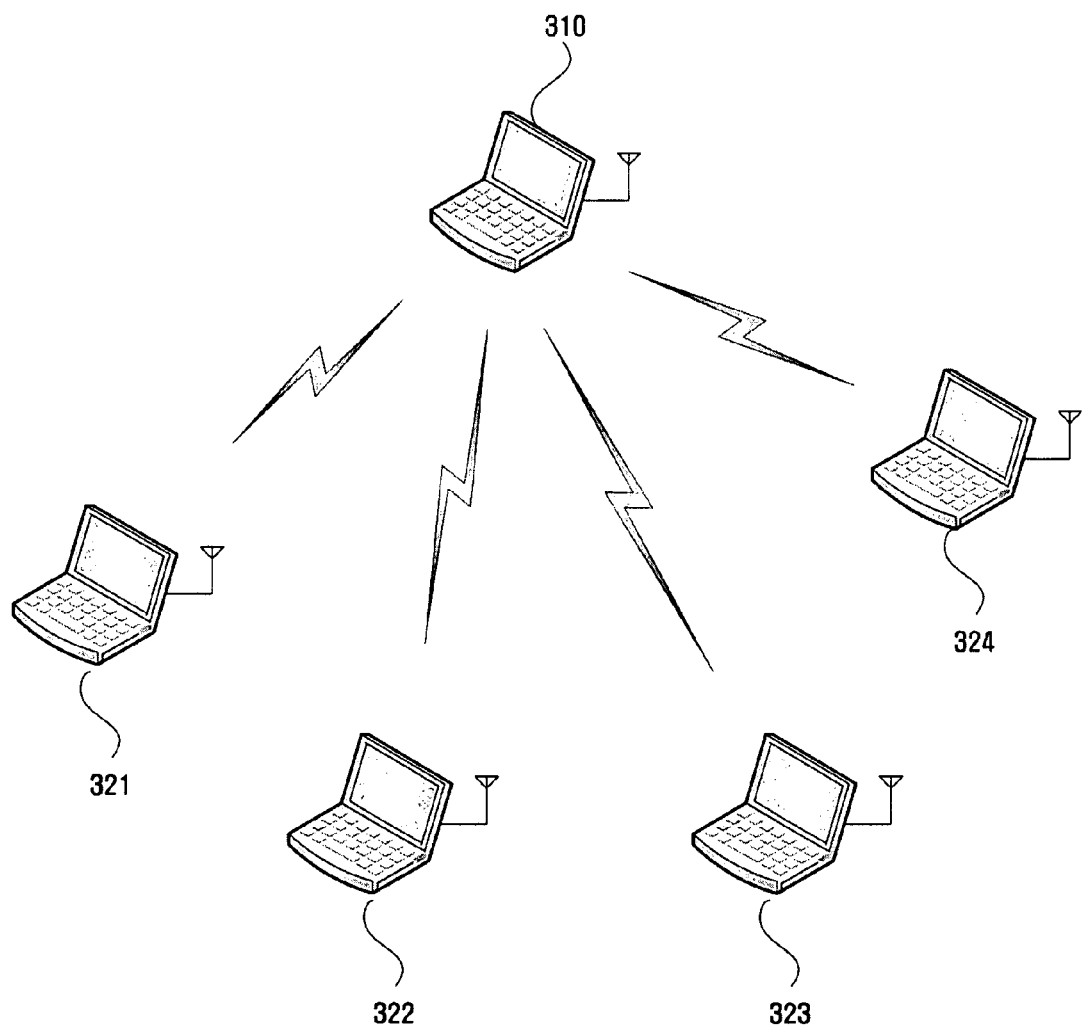
FIG. 3 is a view illustrating the conception of a wireless network system according to an exemplary embodiment of the present invention.

FIG. 3 is a view illustrating the conception of a wireless network system according to an exemplary embodiment of the present invention. A wireless network system includes a wireless network coordinator 310 and wireless network stations 321, 322, 323, and 324.

The wireless coordinator 310 transmits a beacon frame, and serves to control bandwidth allocation of the stations 321, 322, 323 and 324 which exist in a network. Namely, one or more stations 321, 322, 323, and 324, which constitute the network, refer(s) to a received beacon frame, and stand(s) by in order to obtain the bandwidth allocation. Otherwise, in a case where bandwidth is allocated to a station, the station is able to transmit data to other stations in an allocated bandwidth.

A network according to an exemplary embodiment of the present invention is constituted in connection with the superframe which includes at least one channel time block, and the channel time block is classified into a reserved channel time block corresponding to a time period which is reserved so that bandwidth may be allocated to a specified station in the network and an unreserved channel time block corresponding to a time period in which bandwidth is allocated to a station which is selected through competition among the stations in the network. Herein, the channel time block represents a time period during which data is transmitted or received among the stations existing in the network. Also, the reserved channel time block and the unreserved channel time block correspond to a channel time allocation period and a contention access period, respectively.

The station, which is to transmit data, either competes with the other stations in the unreserved channel time block to transmit the data, or is able to transmit the data in the reserved channel time block which is allocated to the station.

Here, a single superframe can include at least one reserved channel time block, wherein a specified reserved channel time block can be set to a period (hereinafter, referred to as "beam search period") during which a packet for a beam search (hereinafter, referred to as "beam search packet") is transmitted or received. Accordingly, any station, to which bandwidth is allocated during the beam search period, can efficiently transmit the beam search packet.

The beam search packet can be classified into a packet for requesting the beam search and a packet for responding to the beam search, and a station which receives data is able to transmit the packet for requesting the beam search to a station which transmits the data. Accordingly, the station which transmits the data, i.e., the sending station, carries out the beam search to transmit the packet for responding to the beam search in response to receiving the packet for requesting the beam search.

In order that the receiving station may receive the beam search packet from sending station, it is possible to allocate bandwidth to the receiving station during the beam search period, wherein a bandwidth allocation request is performed through competition among the stations in the network in unreserved channel time block in the superframe. Herein, the priority of a packet for requesting a bandwidth allocation during the beam search period (hereinafter, referred to as "first bandwidth allocation request packet") is higher than that of a packet for requesting a bandwidth allocation for a different purpose (hereinafter, referred to as "second bandwidth allocation request packet"). For example, when a first station and a second station respectively transmit a first bandwidth allocation request packet and a second bandwidth allocation request packet, as the first bandwidth allocation request packet has a higher priority than the second bandwidth allocation request packet, the wireless network coordinator 310 allocates bandwidth in a specified reserved channel time block to the first station.

Figure 4:
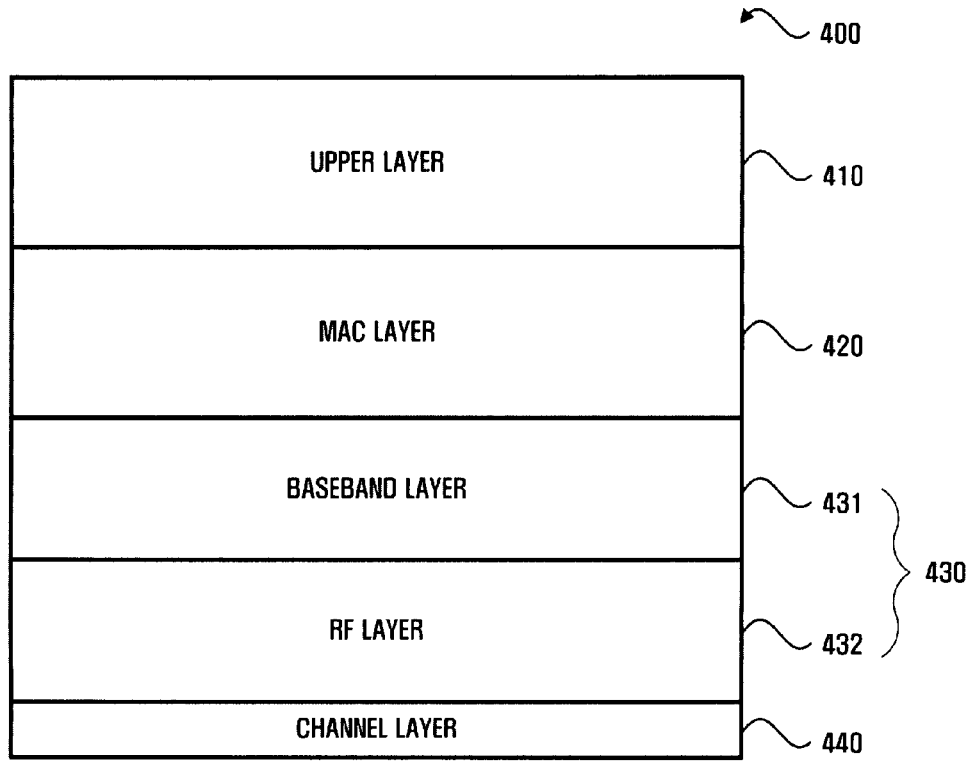
FIG. 4 is a view illustrating the conception of communication layers according to an exemplary embodiment of the present invention.

FIG. 4 is a view illustrating the conception of communication layers according to an exemplary embodiment of the present invention.

Generally, a communication layer 400 includes the channel layer 440, which is located at the lowest layer and is a physical medium in a designated frequency bandwidth in which a radio signal propagates, a physical layer 430 which includes a Radio Frequency (RF) layer 432 and a baseband layer 431, a Media Access Control (MAC) layer 420, and an upper layer 410. Herein, the upper layer 410, which is higher than MAC layer 420, can include a Long Link Control (LLC) layer, a network layer, a transmission layer, an application layer, and so forth.

Meanwhile, a radio frequency channel according to an exemplary embodiment of the present invention can include not only a low frequency bandwidth such as 2.4 GHz or 5 GHz, but also a high frequency bandwidth such as 60 GHz. Therefore, the channel layer 440 can carry out not only a nondirectional communication, but also a unidirectional communication.

Figure 5:
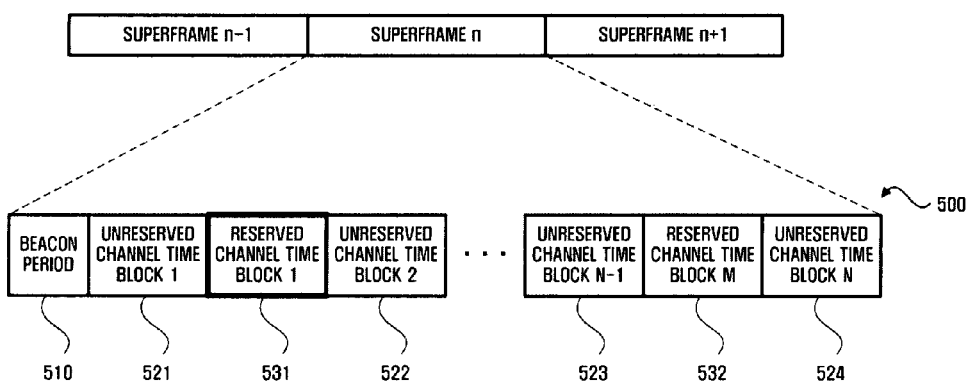
FIG. 5 is a view illustrating the conception of a superframe according to an exemplary embodiment of the present invention.

FIG. 5 is a view illustrating the conception of a superframe according to an exemplary embodiment of the present invention. The superframe 500 includes a beacon period 510, unreserved channel time blocks 521, 522, 523, and 524, and reserved channel time blocks 531 and 532. Depending on the number N of unreserved channel time blocks and the number M of reserved channel time blocks, there may be more channel time blocks between the unreserved channel time block 2 522 and the unreserved channel time block N-1 523.

During the beacon period 510, the wireless network coordinator distributes a beacon frame. The stations, each of which receives the beacon frame, refer to reserved information included in the beacon frame, then compete with one another in obtaining bandwidth in the network, and come to be able to transmit/receive data to/from the stations.

The unreserved channel time blocks 521, 522, 523, and 524 correspond to periods during which more than two stations, which are to transmit data, compete with one another, and the only station which is selected in the competition can transmit data in an allocated bandwidth.

The reserved channel time blocks 531 and 532 correspond to periods during which bandwidth is allocated to a specified station, and the only specified station, to which the bandwidth is allocated, can transmit data, which the specified station intends to transmit, in the allocated bandwidth.

In the meantime, as illustrated in FIG. 5, a single superframe can include at least one unreserved channel time blocks 521, 522, 523 and 524, and at least one reserved channel time blocks 531 and 532, wherein a specified reserved channel time block 531 can be set to the beam search period. Namely, among stations existing in the network, any station, to which bandwidth is allocated during the beam search period, can transmit/receive the beam search packet to/from the stations during the period corresponding to the specified reserved channel time block 531.

In obtaining the bandwidth allocated during the beam search period, the stations compete with one another in the unreserved channel time block of the superframe. Namely, the stations compete with one another in transmitting packets for requesting bandwidth allocation, to the wireless network coordinator which can first process the packet (i.e., the first bandwidth allocation request packet) for requesting a bandwidth allocation during the beam search period, among the received packets. In other words, upon receiving the first and the second bandwidth allocation request packets, and control packets, the wireless network coordinator first carries out a process of the first bandwidth allocation request packet, so that information, which signifies that bandwidth is allocated during the beam search period, is inserted to the beacon frame. The wireless network coordinator defers a process of the second bandwidth allocation request packet or a process of the control packets.

The beam search period corresponds to the reserved channel time block, and the stations which receive the beacon frames can defer transmitting and receiving data in support of the stations to which bandwidth is allocated during the beam search period.

Figure 6:
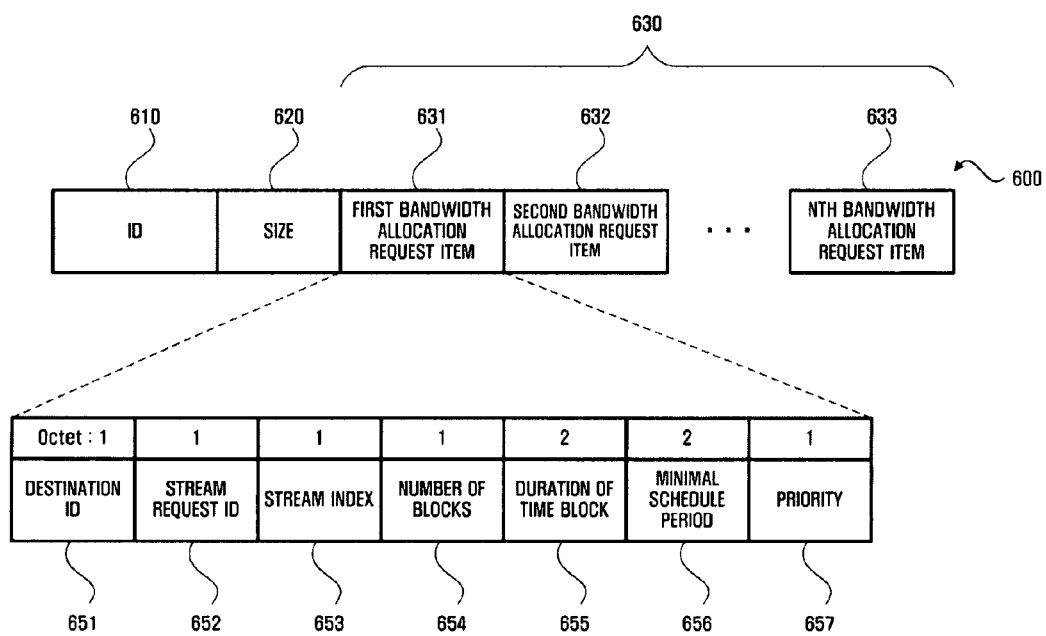
FIG. 6 is a view illustrating the conception of a packet for requesting bandwidth allocation according to an exemplary embodiment of the present invention.

FIG. 6 is a view illustrating the concept of a packet for requesting bandwidth allocation according to an exemplary embodiment of the present invention. Referring to FIG. 6, the bandwidth allocation request packet 600 can include an identifier field 610, a size field 620, and at least one bandwidth-allocation-request-item field 630.

The identifier field 610 includes a flag or a unique identifier which represents that a relevant packet corresponds to the bandwidth allocation request packet, and the size field 620 includes the size of the bandwidth allocation request packet.

Each of the bandwidth allocation request item fields 631, 632, and 633 includes at least one field among a destination identifier field 651, a stream request identifier field 652, a stream index field 653, a block number field (i.e., a field for the number of blocks) 654, a duration of time block field (i.e., a field for the duration between time blocks) 655, a minimum schedule period field 656, and a priority field 657. In the exemplary embodiment of FIG. 6, all of the above fields are included in the first bandwidth allocation request item 631.

In the above, the destination identifier field 651 includes an identifier of a station which requests the bandwidth allocation.

The stream request identifier field 652 includes an identifier of information which a station has requested before receiving a stream index from the wireless network coordinator. If the requested information is for requesting a bandwidth allocation with respect to a new isochronous stream, the stream request identifier is set to a value which is not a unique zero generated by the station among a number of requests for allocating the bandwidth to the station. Then, the stream request identifier sustains a set value thereof throughout the process of the entire packet exchange in which a new stream is transmitted or received. If the requested information is either to modify or to eliminate an existent stream, or to request a bandwidth allocation with respect to asynchronous data, then the stream request identifier is set to zero.

The stream index field 653 includes a stream index which is assigned by the wireless network coordinator, and the assigned stream index signifies the type of data which is assigned to be transmitted and received in the channel time blocks. For example, in the case where a station requests generation of the isochronous stream, the unassigned stream index can be specified, wherein the stream index can be a value which is defined by the station. Meanwhile, if the station requests the asynchronous channel time block to be reserved or to be eliminated, the stream index can be set to a value of the asynchronous stream. Also, the stream index can be set to a value for requesting an existing schedule to be modified or to be eliminated. Namely, the stream index can be set to a value for reserving a bandwidth, wherein the relevant packet can stand for a bandwidth-allocation-request packet when the stream index field 653 specifies the value for reserving a bandwidth.

The block number field 654 specifically includes the number of the channel time blocks which are requested in a superframe.

The duration of time block field 655 specifically includes the duration between the respective channel time blocks included in the superframe The minimum schedule period field 656 specifically includes the minimum allowed time between the start time of two sequential time blocks for this allocation.

The priority field 657 specifically includes the priority of the stream. The priority can be used as the level of quality of service of the stream or for special use, and is the highest in the case of request for a periodical beam search.

Therefore, among received packets, the wireless network coordinator can first perform a processing of a packet that includes the priority field which includes the priority of a packet which requests bandwidth allocation for the beam search.

Figure 7:
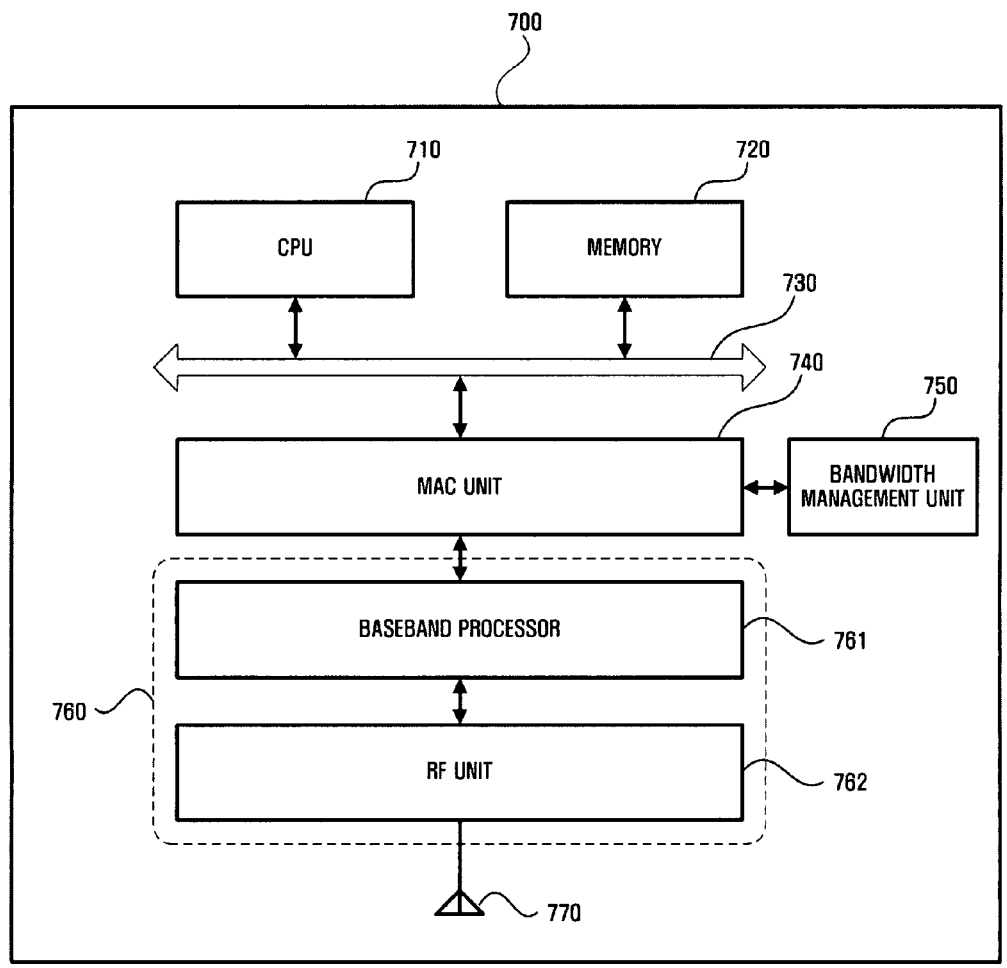
FIG. 7 is a block diagram illustrating a wireless network coordinator according to an exemplary embodiment of the present invention.

FIG. 7 is a block diagram illustrating a wireless network coordinator according to an exemplary embodiment of the present invention. With reference to FIG. 7, a wireless network coordinator 700 includes Central Processing Unit (CPU) 710, a memory 720, a Media Access Control (MAC) unit 740, a bandwidth management unit 750, and a PHYsical (PHY) unit 760.

The CPU 710 controls the other units which are connected to a bus 730, and is in charge of a process with respect to the upper layer 410 which is illustrated in FIG. 4. Therefore, the CPU 710 processes receiving data (receiving Media access control Service Data Unit (MSDU)) which is provided by the MAC unit 740, or generates transmission data (a transmission MSDU) which is then provided to the MAC unit 740.

The memory 720 serves to store data, and is a module, such as a hard disk, an optical disc, a flash memory, a Compact Flash (CF) card, a Secure digital (SD) card, a Smart Media (SM) card, a MultiMedia Card (MMC), a memory stick, and others, which is able to input/output information. The wireless network coordinator 700 is equipped with the memory 720 either inside or as separate equipment.

The MAC unit 740 serves to generate the beacon frame for constituting the superframe, which includes at least one channel time block. Herein, the bandwidth management unit 750 can set a reserved channel time block specified among reserved channel time blocks to a period during which stations in the network are compelled to transmit or receive the a beam search packet (i.e., a beam search period).

Also, as the bandwidth management unit 750 can set at least one channel time block to the beam search period(s), a single superframe can include at least one beam search period.

The PHY unit 760 converts the beacon frame, which is generated by the MAC unit 740, into a radio signal, and serves to transmit the radio signal through a designated communication channel. For this purpose, the PHY unit 760 includes a baseband processor 761 and an RF unit 762, and is connected to an antenna 770. The antenna 770 is able to transmit or receive a directional radio signal in a high frequency band. Herein, the communication channel which is formed by the RF unit 762 includes a communication channel such as 60 GHz bandwidth.

The beam search packet includes at least one out of a beam search request packet from a receiving station requesting the beam search and a beam search response packet from a sending station performing the beam search. Namely, while the receiving station which receives a designated data checks the reception sensitivity, if it is judged that the reception sensitivity is weak, then the receiving station is able to transmit the beam search request packet to the sending station during the beam search period. In response to the beam search request packet, the sending station performs the beam search, and can subsequently transmit the beam search response packet. Herein, the transmitted and received data includes not only compressed data, but also uncompressed data.

Figure 8:
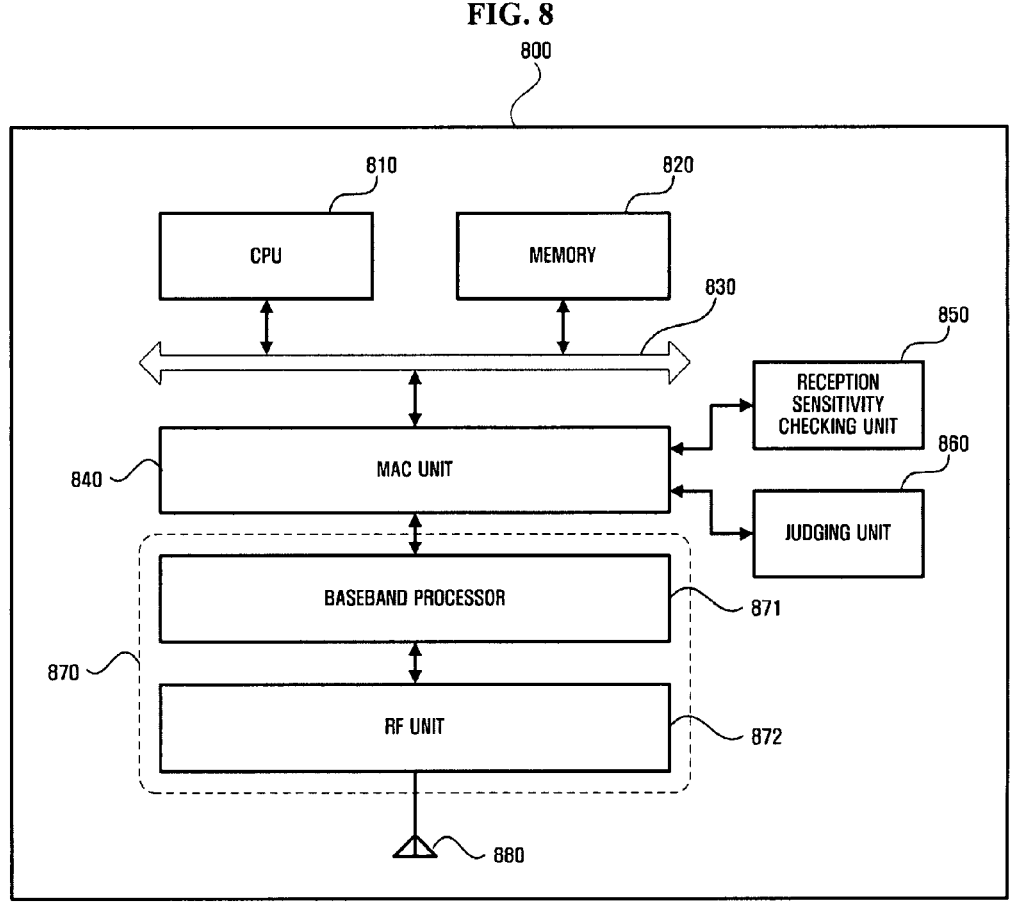
FIG. 8 is a block diagram illustrating a station according to an exemplary embodiment of the present invention.

FIG. 8 is a block diagram illustrating a station according to an exemplary embodiment of the present invention. Referring to FIG. 8, a station 800 includes a Central Processing Unit (CPU) 810, a memory 820, a Media Access Control (MAC)

unit 840, a reception sensitivity checking unit 850, a judging unit 860, and a PHYsical (PHY) unit 870.

The CPU 810 controls the other units which are connected to a bus 830, and is in charge of a process with respect to the upper layer 410, which is illustrated in FIG. 4.

Therefore, CPU 810 processes receiving data (receiving Media access control Service Data Unit (MSDU)) which is provided by the MAC unit 840, or generates transmission data (transmission MSDU) which is then provided to the MAC unit 840.

The memory 820 serves to store data. The memory 820 is a module, which is able to input or output information, such as a hard disk, an optical disc, a flash memory, a Compact Flash (CF) card, a Secure digital (SD) card, a Smart Media (SM) card, a MultiMedia Card (MMC), a memory stick, and others. The station 800 is equipped with the memory 820 either inside or as separate equipment.

The MAC unit 840 adds a MAC header to an MSDU (i.e., data to be transmitted) which is provided by the CPU 810, and generates a Media access control Protocol Data Unit (MPDU).

The PHY unit 870 converts the MPDU, which is generated by the MAC unit 840, into a radio signal, and serves to transmit the radio signal through a communication channel. For this purpose, the PHY unit 870 includes a baseband processor 871 and an RF unit 872, and is connected to an antenna 880. The antenna 880 is able to transmit or receive a directional radio signal in a high frequency band.

The baseband processor 871 adds a signal field and a preamble to the MPDU provided by the MAC unit 840, and generates a Presentation Protocol Data Unit (PPDU). The RF unit 872 converts the PPDU into a radio signal, and transmits the radio signal via the antenna 880.

Meanwhile, in order to serve as a sending station, the station 800 either obtains bandwidth in the reserved channel time block in the superframe, or can compete with the other stations in the unreserved channel time block. Otherwise, in order to serve as a receiving station, the station 800 is able to receive data from another station (i.e., the sending station), then checks the reception sensitivity of the received data, and enables the sending station to perform the beam search. Hereinafter, the station 800 represents the receiving station.

The PHY unit 870 can receive data which is transmitted by the sending station, the received data is output to the reception sensitivity checking unit 850.

Subsequently, the reception sensitivity checking unit 850 checks the reception sensitivity of the received data in order to make sure the magnitude thereof is smaller than the critical value to generate a checking result signal.

Upon receiving the checking result signal of the reception sensitivity checking unit 850, the MAC unit 840 generates a beam search request packet which is then transmitted to the sending station by the PHY unit 870 through a designated communication channel. The sending station performs the beam search on the basis of the contents included in the beam search request packet, and transmits the beam search response packet.

Because it is more important to transmit/receive the beam search packets (i.e., the beam search request packet and the beam search response packet) than other kinds of packets, it is desirable that the transmission or reception thereof is performed in the reserved channel time block. For this purpose, the station 800 requests the wireless network coordinator 700 to allocate bandwidth during at least one period among periods of the superframe for the transmission/reception of the beam search packet.

Namely, in order to obtain bandwidth allocated in a reserved channel time block specified among one or more reserved channel time blocks included in the superframe, the MAC unit 840 generates a bandwidth allocation request packet which is then transmitted by the PHY unit 870. As described above, because the priority of the bandwidth allocation request packet for the beam search (i.e., the first bandwidth allocation request packet) is higher than that of the other packets, the MAC unit 740 of the wireless network coordinator 700 first performs a process concerning the first bandwidth allocation request packet. Accordingly, after setting a channel time block to a period during which a bandwidth is allocated for the beam search (i.e., the beam search period), the wireless network coordinator 700 transmits a response packet in response to the setting. Herein, the response packet includes the beacon frame.

The beacon frames are distributed to all the stations in the network. The judging unit 860 refers to the bandwidth allocation information included in the beacon frame to judge whether or not the bandwidth allocation is performed, and a result of the judgment is provided to the MAC unit 840. In a case where the bandwidth allocation is performed in response to the request of the station 800, the PHY unit 870 transmits the beam search request packet, which is generated by the MAC unit 840, through a designated communication channel in the channel time block in which bandwidth is allocated (i.e., the beam search period).

Meanwhile, there can be a number of stations in the network, where each of the stations competes with one another during the competition period of the superframe in obtaining the allocation of the bandwidth, and each is able to transmit the bandwidth allocation request packet. At this time, the scheme for gaining access to used media can include the Carrier Sense Multiple Access with Collision Avoidance (CSMA/CA) protocol or the Slotted Aloha protocol.

In the case where a packet for acknowledging the bandwidth allocation is received from the wireless network coordinator 700 in response to the transmission of the bandwidth allocation request packet, the MAC unit 840 generates data as in the process described above, wherein a communication channel has a 60 GHz bandwidth, and wherein the transmitted data can be compressed data.

Any station, which has the bandwidth management unit 750 among the stations existing in the network, is able to serve as a wireless network coordinator. Namely, in this case, the station generates a beacon frame to distribute the beacon frame, and then is able to provide the beam search period to other stations in the network.

FIG. 9 is a flowchart illustrating an operation of the wireless network coordinator according to an exemplary embodiment of the present invention.

When a station (i.e., a receiving station), which receives data from another station (i.e., a sending station) among stations in the network, needs the sending station to perform a beam search, the receiving station transmits a bandwidth allocation request packet which is then received by the wireless network coordinator 700 (S910).

At this time, the bandwidth allocation request packet is transmitted through an unreserved channel time block in a superframe. As this packet has a higher priority than other packets, the wireless network coordinator 700 first processes this packet before processing other packets.

With the reception of the bandwidth allocation request packet, the bandwidth management unit 750 can set a reserved channel time block, which is specified, among the reserved channel time blocks in the superframe, to a period (i.e., the beam search period) during which the beam search packet is transmitted and received among the stations in the network (S920).

Furthermore, the MAC unit 740 generates the beacon frame in order to constitute the superframe which includes at least one channel time block (S930), and then it is possible for the beacon frame to include bandwidth allocation information.

The beacon frame which is generated in S930 is transmitted during a beacon period in the superframe, and is distributed to the each of the stations connected to the network with an enable status (S940). As a result, both a receiving station and a sending station, to each of which bandwidth is allocated, are able to receive and transmit the beam search packet during the beam search period.

FIG. 10 is a flowchart illustrating a process in which the station according to an exemplary embodiment of the present invention transmits or receives data.

With reference to FIG. 10, the receiving station is able to receive data from the sending station in the network (S1010). At this time, the reception sensitivity checking unit 850 of the receiving station checks the reception sensitivity of the received data (S1020), and provides a result of the check to the MAC unit 840.

Based on the on the result, MAC unit 840 makes the reception of the data proceed when it is judged that the reception sensitivity thereof is equal to or more than the critical value (S1030), and when it is judged that the reception sensitivity thereof is less than the critical value S1030, generates a packet (i.e., the bandwidth allocation request packet) for allocating bandwidth in a reserved channel time block which is specified among one or more reserved channel time blocks (S1040). The MAC unit 840 enables the PHY unit 870 to transmit a generated bandwidth allocation request packet (S1050).

The packet as transmitted above is transmitted to the wireless network coordinator 700, and the PHY unit 870 receives a packet for responding to the transmitted packet. Herein, the response packet includes the beacon frame.

Successively, the judging unit 860 refers to bandwidth allocation information, and judges whether the bandwidth allocation is performed (S1060). When it is judged that the bandwidth allocation should not be performed (S1060), the generation and the transmission of the bandwidth allocation request packet can be performed repeatedly (S1040 and S1050).

Meanwhile, when it is judged that the bandwidth allocation should be performed (S1060), the MAC unit 840 generates a beam search request packet (S1070), and enables the PHY unit 870 to transmit a generated beam search request packet (S1080).

The sending station, which has received the beam search request packet, performs a beam search, and transmits a packet for responding to the beam search. Because the transmission/reception of the beam search packet is performed in a reserved channel time block, it is possible for the transmission/reception thereof to proceed with guaranteed stability.

Exemplary benefits and effects of exemplary embodiments, as disclosed in the present invention, and as so configured to operate above, will be described as follows.

According to the present invention as described above, the wireless network system and the method for transmitting and receiving data in the wireless network have a particular time period for a beam search in a superframe thereof, and enable stations, which carry out directional communications with a high frequency bandwidth, to efficiently perform a beam search.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A wireless network coordinator in a wireless network system, the wireless network coordinator comprising:
    a media access control unit which generates a beacon frame of a superframe, the superframe comprising at least one channel time block and the beacon;
    a bandwidth management unit which sets a specific channel time block among the at least one channel time block to a time period during which a packet for a beam search is transmitted and received among stations in a network, during a setting; and
    a transmission unit which transmits the beacon frame comprising information on the setting through a predetermined communication channel.

2. The wireless network coordinator of claim 1, wherein the media access control unit first performs a processing for a specific packet among received packets, wherein the specific packet comprises a priority field which specifies a priority of a packet requesting a bandwidth allocation of a period during which the packet for the beam search is transmitted or received.

3. The wireless network coordinator of claim 1, wherein the at least one channel time block comprises:
    a reserved channel time block corresponding to a time period which is reserved so that a reserved bandwidth is allocated to a specified station in the network; and
    an unreserved channel time block corresponding to a time period in which a unreserved bandwidth is allocated to a station selected through competition among stations in the network.

4. The wireless network coordinator of claim 3, wherein the specific channel time block corresponds to the reserved channel time block.

5. The wireless network coordinator of claim 3, wherein the bandwidth management unit performs the setting in response to a packet which requests a bandwidth allocation of a period during which the packet for the beam search is transmitted or received, wherein the stations in the network transmit the packet for the beam search in competition with one another in the unreserved channel time block.

6. The wireless network coordinator of claim 5, wherein a scheme by which the packet requesting the bandwidth allocation in the unreserved channel time block is transmitted or received, comprises Carrier Sense Multiple Access with Collision Avoidance protocol or Slotted Aloha protocol.

7. The wireless network coordinator of claim 5, wherein the packet requesting the bandwidth allocation comprises at least one of:
    a destination identifier field comprising an identifier of an objective station requesting the bandwidth allocation;
    a stream request identifier field comprising an identifier of information which has been requested before the objective station receives a stream index;
    a stream index field comprising the stream index which is a kind of data to be transmitted or received in the specific channel time block;
    a field for a number of blocks comprising a number of the specific channel time blocks in the superframe;
    a field for a duration of time block comprising a duration between the respective channel time blocks in the superframe;

a minimum schedule period field comprising a minimum allowed time between start times of two sequential time blocks for the bandwidth allocation; and a priority field comprising a priority of the packet requesting the bandwidth allocation.

8. The wireless network coordinator of claim 1, wherein the at least one channel time block corresponds to a specified time period during which data is transmitted and received among the stations existing in the network.

9. The wireless network coordinator of claim 1, wherein the communication channel comprises a communication channel having a 60 GHz bandwidth.

10. A station for transmitting and receiving data in a wireless network system, the station comprising:

a media access control unit which generates a packet which requests bandwidth allocation in a specific channel time block among one or more channel time blocks of a superframe; and a transmission unit which transmits a packet which requests a beam search through a designated communication channel in the specific channel time block when the bandwidth allocation has been performed in response to the packet which requests bandwidth allocation.

11. The station of claim 10, wherein the packet requesting the bandwidth allocation has a highest priority in an unreserved channel time block among the one or more channel time blocks.

12. The station of claim 10, wherein the one or more channel time blocks comprises:

a reserved channel time block corresponding to a time period which is reserved so that a reserved bandwidth is allocated to a specified station in a network; and an unreserved channel time block corresponding to a time period in which an unreserved bandwidth is allocated to a station selected through competition among stations in the network.

13. The station of claim 12, wherein the specific channel time block corresponds to the reserved channel time block.

14. The station of claim 12, wherein the transmission unit transmits the packet which requests the bandwidth allocation through competition among stations in the unreserved channel time block among the one or more channel time blocks.

15. The station of claim 14, wherein a scheme by which the competition is performed comprises Carrier Sense Multiple Access with Collision Avoidance protocol or Slotted Aloha protocol.

16. The station of claim 10, wherein the packet requesting the bandwidth allocation comprises at least one of:

a destination identifier field comprising an identifier of an objective station requesting the bandwidth allocation;

a stream request identifier field comprising an identifier of information which has been requested before the objective station receives a stream index;

a stream index field comprising the stream index which is a kind of data to be transmitted or received in the specific channel time block;

a field for a number of blocks comprising a number of the specific channel time blocks included in the superframe;

a field for a duration of time block comprising a duration between the respective channel time blocks included in the superframe;

a minimum schedule period field comprising a minimum allowed time between start times of two sequential time blocks for the bandwidth allocation; and a priority field comprising a priority of the packet requesting the bandwidth allocation.

17. The station of claim 10, wherein the one or more channel time blocks corresponds to a specified time period during which data is transmitted and received among stations existing in a network.

18. The station of claim 10, wherein the communication channel comprises a communication channel having a 60 GHz bandwidth.

19. A method of constructing a network in a wireless network system, the method comprising:

generating a beacon frame of a superframe, the superframe comprising at least one channel time block and the beacon frame;

setting a specific channel time block among the at least one channel time block to a time period during which a packet for a beam search is transmitted and received among stations in a network, during a setting; and transmitting the beacon frame comprising information on the setting through a predetermined communication channel.

20. The method of claim 19, further comprising performing a processing of a packet including a priority field which specifies a priority of a packet requesting a bandwidth allocation, wherein the packet including the priority field is processed before other received packets.

21. The method of claim 19, wherein the at least one channel time block comprises:

a reserved channel time block corresponding to a time period which is reserved so that a reserved bandwidth is allocated to a specified station in the network; and an unreserved channel time block corresponding to a time period in which an unreserved bandwidth is allocated to a station selected through competition among stations in the network.

22. The method of claim 21, wherein the specific channel time block corresponds to the reserved channel time block.

23. The method of claim 21, wherein the setting of a specific channel time block comprises performing the setting in response to a packet which requests a bandwidth allocation of a period during which the packet for the beam search is transmitted and received, wherein the stations in the network transmit the packet for the beam search in competition with one another in the unreserved channel time block.

24. The method of claim 23, wherein a scheme by which the packet requesting the bandwidth allocation in the unreserved channel time block is transmitted or received comprises Carrier Sense Multiple Access with Collision Avoidance protocol or the Slotted Aloha protocol.

25. The method of claim 23, wherein the packet requesting the bandwidth allocation comprises at least one of:

a destination identifier field comprising an identifier of an objective station requesting the bandwidth allocation;

a stream request identifier field comprising an identifier of information which has been requested before the objective station receives a stream index;

a stream index field comprising the stream index which is a kind of data to be transmitted or received in the specific channel time block;

a field for a number of blocks comprising a number of the specific channel time blocks included in the superframe;

a field for a duration of time block comprising a duration between the respective channel time blocks included in the superframe;

a minimum schedule period field comprising a minimum allowed time between start times of two sequential time blocks for the bandwidth allocation; and a priority field comprising a priority of the packet requesting the bandwidth allocation.

26. The method of claim 19, wherein the at least one channel time block corresponds to a specified time period during which data is transmitted and received among the stations existing in the network.

27. The method of claim 19, wherein the communication channel comprises a communication channel having a 60 GHz bandwidth.

28. A method of transmitting and receiving data among stations in a wireless network system, the method comprising:
  generating a first packet which requests bandwidth allocation in a specific channel time block among one or more channel time blocks of a superframe;
  transmitting the first packet produced in the generating; and
  transmitting a second packet which requests a beam search through a designated communication channel in the specific channel time block when the bandwidth allocation has been performed in response to the transmitted first packet.

29. The method of claim 28, wherein the first packet requesting the bandwidth allocation has a highest priority in an unreserved channel time block among the one or more channel time blocks.

30. The method of claim 28, wherein the one or more channel time block comprises:
  a reserved channel time block corresponding to a time period which is reserved so that a reserved bandwidth is allocated to a specified station in a network; and
  an unreserved channel time block corresponding to a time period in which an unreserved bandwidth is allocated to a station selected through competition among stations in the network.

31. The method of claim 30, wherein the specific channel time block corresponds to the reserved channel time block.

32. The method of claim 30, wherein the transmitting the first packet which requests the bandwidth allocation comprises transmitting the first packet which requests the bandwidth allocation, through competition among the stations in the unreserved channel time block among the one or more channel time blocks.

33. The method of claim 32, wherein a scheme by which the competition is performed comprises Carrier Sense Multiple Access with Collision Avoidance protocol or Slotted Aloha protocol.

34. The method of claim 28, wherein the packet requesting the bandwidth allocation comprises at least one of:
  a destination identifier field comprising an identifier of an objective station requesting the bandwidth allocation;
  a stream request identifier field comprising an identifier of information which has been requested before the objective station receives a stream index;
  a stream index field comprising the stream index which is a kind of data so designated to be transmitted or received in the specific channel time block;
  a field for a number of blocks comprising a number of the specific channel time blocks included in the superframe;
  a field for a duration of time block comprising a duration between the respective channel time blocks included in the superframe;
  a minimum schedule period field comprising a minimum allowed time between start times of two sequential time blocks for the bandwidth allocation; and
  a priority field comprising a priority of the packet requesting the bandwidth allocation.

35. The method of claim 28, wherein the one or more channel time blocks corresponds to a specified time period during which data is transmitted and received among stations existing in a network.

36. The method of claim 28, wherein the communication channel comprises a communication channel having a 60 GHz bandwidth.

* * * * *